Nov. 23, 1965

G. F. BUTLER ETAL 3,219,536

NUCLEAR REACTORS

Filed Dec. 7, 1960

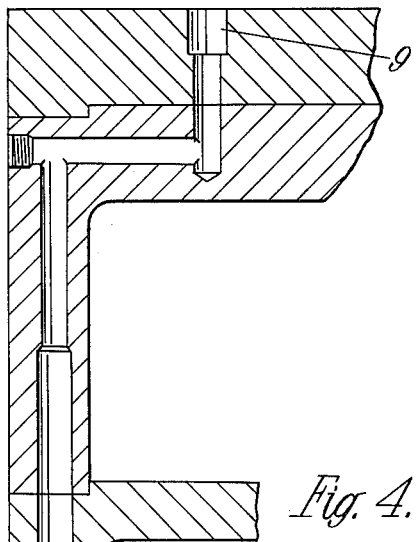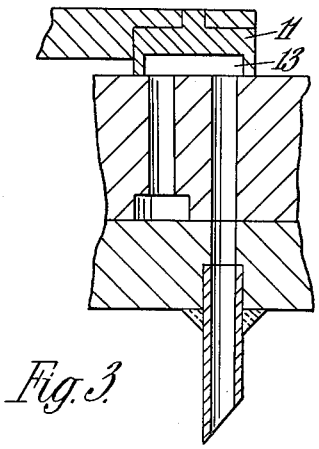
Fig. 3.
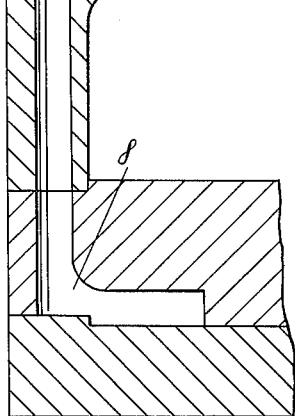
Fig. 4.
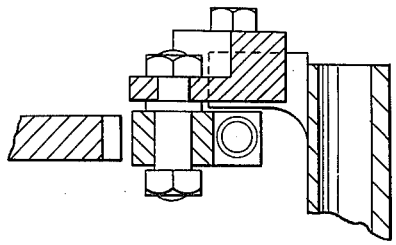
Fig. 7.
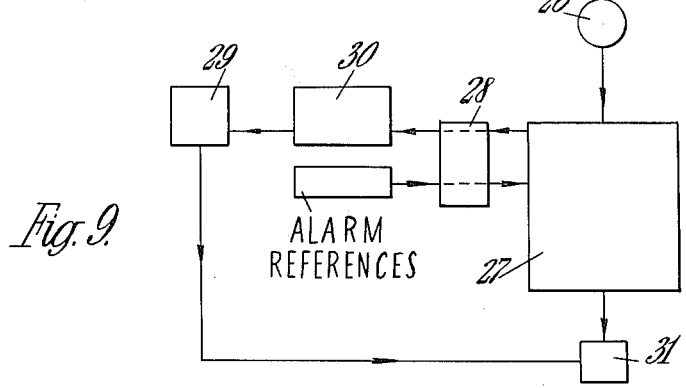
Fig. 9.

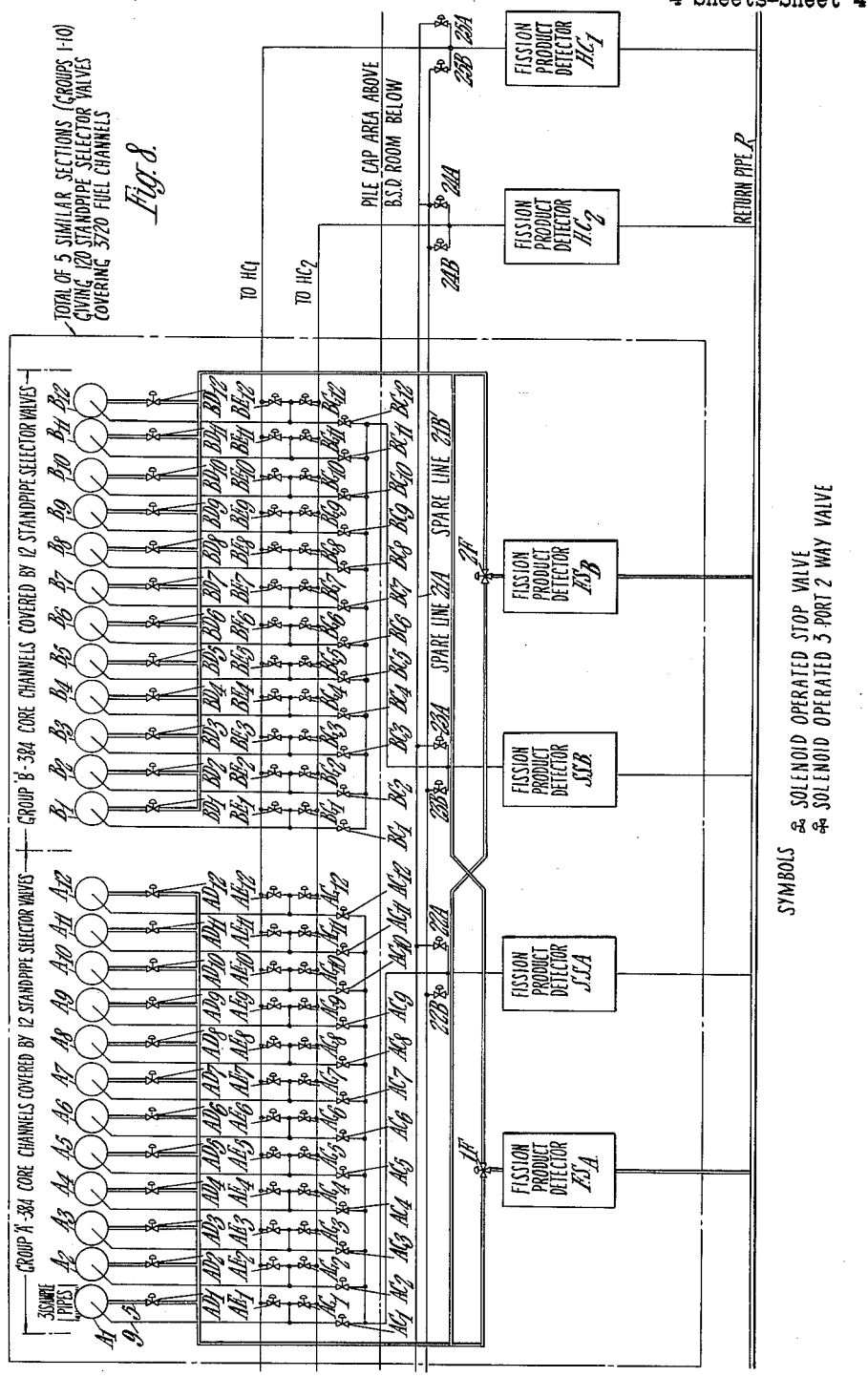

United States Patent Office 3,219,536
Patented Nov. 23, 1965

3,219,536
NUCLEAR REACTORS
Graham Frederick Butler and William Paul Engleheart, Newcastle-upon-Tyne, England, assignors to The Nuclear Power Plant Company Limited, Newcastle-upon-Tyne, England
Filed Dec. 7, 1960, Ser. No. 74,407
Claims priority, application Great Britain, Dec. 7, 1959, 41,529/59
7 Claims. (Cl. 176—19)

This invention relates to nuclear reactors and is concerned with apparatus for burst slug detection that is for the detection of faults in fuel elements in the reactor, the faults being of the kind which result in the escape of fission products from the element.

In gas cooled graphite moderated reactors it is common practice to house the nuclear fuel, usually natural uranium, in closed containers to prevent the escape of fission products into the cooling gas stream. Faults can occur which lead to cracks in the containers and it is important to detect the faults as quickly as possible.

There are two main types of faults the first being due to faulty manufacture of the fuel container. One source of possible trouble in this respect is the weld sealing an end cap to the container. Faults in the weld can provide a long diffusion path for fission products and initially the escape of fission products is very small and usually goes undetected. As the diffusion continues, uranium oxide builds up at the fault and tends to distort the container. Finally the distortion produced can suddenly rupture the container with consequent large emission of fission products. Such a burst can be serious and may necessitate shutting down the reactor.

The second type of fault is due to metallurgical changes in the material of the container due to intense irradiation and heat. Such faults mainly lead to small leakage of fission products initially followed by a gradual increase. With such faults it is possible to leave the fuel element in the reactor for several days but it is an advantage to have an early warning of the fault so that the removal of the faulty element can be fitted into the normal schedule for the changing of fuel elements.

The main requirements of a fault detecting system hereinafter called a "burst slug detection system" are firstly an ability rapidly to detect a large burst for which sensitivity need not be high, secondly the ability to give the earliest possible warning of a small gradually increasing burst, for which the sensitivity must be very high and thirdly to locate accurately the fuel channel where the burst has occured.

The above requirements for such a burst slug detection system can be met by having a large number of fission product detectors each coupled to a small number of fuel channels. A limit is, however, imposed on this in commercial reactors where the fuel channels are numbered in thousands.

The usual method is to employ a system which scans the fuel channels individually in groups of about eight with a scan time of about 20 minutes. The methods of grouping and scanning are various but the time lag between a burst and its detection may be too great for safety.

The object of the present invention is to provide a burst slug detection system for a nuclear reactor which system fulfills the above requirements, in which the time lag between the occurrence of a fault and its detection is considerably reduced.

The invention consists in systems in accordance with the following numbered clauses namely:

(1) A burst slug detection system for a nuclear reactor, which system comprises means for continuously passing to fission product detection means, mixed samples of cooling fluid from each of a series of groups of fuel element containing channels in the reactor, together with means for passing samples of cooling fluid from each fuel channel of a group in turn, the sampling of individual channels and groups of channels taking place simultaneously:

(2) A burst slug detection system for a nuclear reactor in accordance with Clause 1 in which the means for passing mixed samples and samples from individual channels to fission product detection means comprise a sampling valve which receives samples from each channel of a group of fuel channels in the reactor and passes a sample from each channel in turn to fission product detection means and at the same time passes a mixed sample from the remaining channels in the group to fission product detection means:

(3) A burst slug detection system for a nuclear reactor incorporating a sampling valve in accordance with Clause 2 in which said valve comprises a flat ported member having two sets of ports, a first set in which each port is conncetcd to a channel in a group of fuel channels in the reactor there being a port for every channel in the group, outlet ends of said port communicating with a common space in the valve to which is connected a mixed sample outlet from which a mixed sample of cooling fluid from the group of channels can pass to fission product detection means and a second set of ports having their outlet ends in communication with a channel common to all the ports in said second set, said channel communicating with an individual sample outlet connected to fission product detection means, the inlet ends of said ports opening into the said space common to the outlet ends of the ports in the first set; and selector means sliding over the surface of said ported member and coming to rest at intervals for a given time to connect one of the ports of said first set to one port in said second set whilst sealing the ends of the remaining ports in the second set, each port of said first set being connected in turn to a port in the second set whereby cooling fluid flowing through the port in the first set connected to a port in the second set can enter the aforesaid channel and pass to fission product detection means connected to the individual sample outlet from said channel and cooling fluid passing through the remaining ports in the first set flows through said common space to fission product detection means via the mixed sample outlet:

(4) A burst slug detection system comprising a sampling valve in accordance with Clause 3 in which the two sets of ports are arranged in concentric rings and the selector means rotates about their common centre:

(5) A burst slug detection system comprising a sampling valve in accordance with any of Clauses 2, 3 and 4 in which the second set of ports are arranged so that one rest position of selector means is a blank position in that it does not connect a port in the first set with a port in the second set the blank position providing an indication of the position of the selector means at regular intervals:

(6) A burst slug detection system for a nuclear reactor comprising a sampling valve in accordance with Clause 5 in which there are an even number, $n$ of equally spaced rest positions of the selector means and the ports of the first and second sets are disposed in separate concentric rings each ring having $n$ positions corresponding to the rest positions of the selector means, $n-1$ positions of the ring of the first set being ports and the other position being a blank position, whilst $n/2$ positions of the ring of the second set are ports and the remainder blank positions, the positions of the second set being displaced circumferentially from the positions of the first set, and the selector means comprises a bridge member having an internal recess which connects the ports of the first set with ports of the second set said recess being dimensioned so that it spans two positions in the ring of the second set and one position of the ring of the first set, the disposition of the ports in the ring of the second set being such that in the blank position of the selector means the recess in the bridge member spans a blank position in the ring of the first set and two adjacent blank positions in the ring of the second set, in one other rest position of the selector means the said recess spans one port in the first set and two adjacent ports in the second set, and in the remaining rest positions of the selector means the recess spans one port of the first set and one port and an adjacent blank position in the second set:

(7) A burst slug detection system for a nuclear reactor comprising a sampling valve in accordance with Clause 5 in which there are an odd number, $n-1$, of equally spaced rest positions of the selector means and the ports of the first and second sets are arranged in separate concentric rings each ring having $n-1$ positions corresponding to the rest positions of the selector means, $n-2$ posititons of the ring of the first set being ports and one a blank position, $$\frac{n-2}{2}$$

positions of the ring of the second set being ports and the remainder blank positions, the positions of the ring of the second set being displaced circumferentially from the positions of the ring of the first set and the selector means comprising a bridge member which has an internal recess for connecting ports of the first set with ports of the second set said recess being dimensioned so that it spans one position of the ring of the first set and two positions of the ring of the second set the disposition of ports in the ring of the second set being such that in the blank position of the selector means the recess spans the blank position in the first set and two adjacent blank positions in the second set and in the remaining rest positions of the selector means the recess spans one port in the first set and a port and a blank position in the second set:

(8) A burst slug detection system for a nuclear reactor comprising a sampling valve in accordance with any of Clauses 2–7 in which the selector means is driven by a bellows operated ratchet arrangement:

(9) A burst slug detection system for a nuclear reactor in accordance with any of Clauses 1–8 in which signals from the fission product detection means representing the mixed samples are recorded on a separate recording chart from those representing individual fuel channels:

(10) A burst slug detection system for a nuclear reactor in accordance with Clause 9 in which a recording chart for mixed samples serves a group of sampling valves, the chart being marked in divisions with one division per valve, and a pen or other trace being provided for each division, a preset alarm level being set for each division so that when the reading for a mixed sample exceeds this level an alarm is actuated.

(11) A burst slug detection system for a nuclear reactor in accordance with Clause 9 in which the recording system for the individual channels comprises a recording chart on which is displayed for each channel and for each scan, a number representing the number of pulses received from the fission product detection means for a given channel and a number representing the preset alarm level for that channel, electrical means being provided to compare the signal from the detection means and a signal representing the alarm level for each channel and to energise an alarm when the signal equals or exceeds the alarm level, said means also acting on the recording means to indicate the channel where the fault has occurred.

(12) A burst slug detection system for a nuclear reactor substantially as described herein with reference to the accompanying drawings.

FIGURE 3 is a section on FF of FIGURE 2;

FIGURE 4 is a part section on EE of FIGURE 2;

FIGURE 7 is a part section on line CC of FIGURE 6;

FIGURE 8 is a diagram showing the connections of the burst slug detection system; and FIGURE 9 is a diagrammatic arrangement of a recording system for individual channels.

Figure 1:
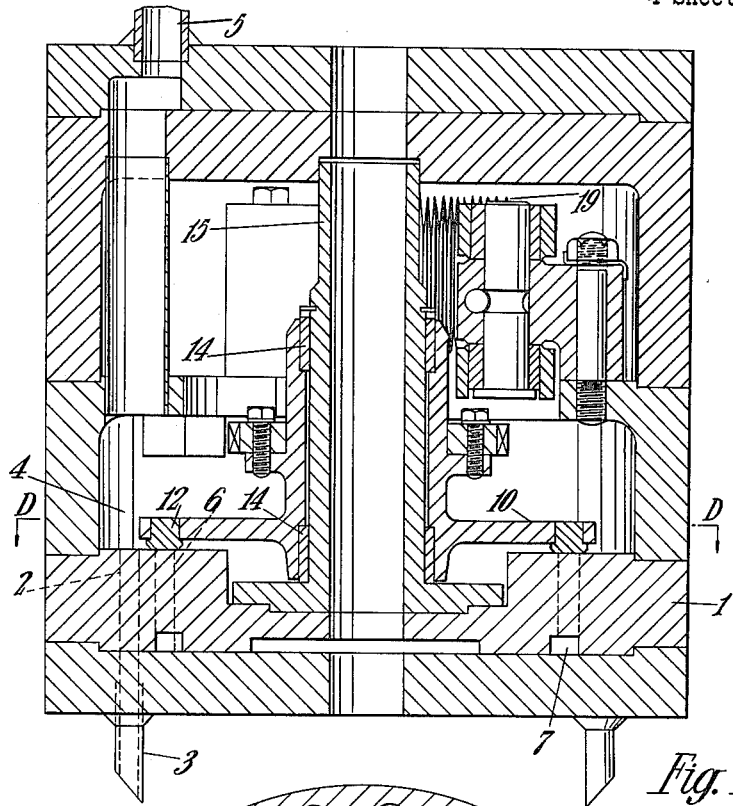
FIGURE 1 is a section through a sampling valve for use with a burst slug detection system in accordance with one form of the present invention.

In carrying the invention into effect in the forms illustrated by way of example and referring first to FIGURES 1–4, a sampling valve comprises an optically flat ported member 1 which contains two sets of ports arranged in separate concentric rings. The outer ring of ports 2 are each connected to a fuel channel in the reactor there being a port for every fuel channel. The fuel channels are divided up into a number or groups and a separate sampling valve is used for each group. Sample pipes 3 conduct cooling fluid from each fuel channel to the ports 2.

The outlet ends of the ports 2 open into a space 4 in the valve which is common to all the ports 2 and an outlet 5 is connected to this space by means of which a mixed sample of cooling fluid can be conveyed to fission product detection means as will be described later.

The inner ring of ports 6 are in communication at their inlet ends with space 4 and at their outlet ends with a channel 7 common to all the ports 6. The channel 7 is connected by duct 8 (see FIGURE 4) to an outlet 9 for individual samples connected to fission product detection means which will be described later.

A selector means 10 in the form of a rotatable plate slides over the surface of the ported member 1 coming to rest at intervals for a given time to connect one of the ports 2 to one of the ports 6 by means of bridge member 11 whilst sealing the ends of the remaining ports 6 in the inner ring by means of sealing buttons or studs 12. As the selector 10 moves it selects cooling fluid from each port 2 in turn and directs it via bridge 11 through a port 6 into channel 7 from which it passes to outlet 9 and thence to fission product detection means.

The bridge member 11 has an internal recess 13 as is shown in FIGURE 3 and this connects with a port 6. In so doing it spans only one of the ports 2 and the cooling fluid flowing through the remainder of these ports enters space 4 and passes to fission product detection means through outlet 5 as a mixed sample from all the ports except the one spanned by the bridge member 11.

The sealing studs 12 may be of graphite and are urged into contact with the ported member 1 by the pressure difference existing between space 4 and channel 7 due to the passage of the sample. The ported member may also be of graphite, or of any material with suitable properties of friction surface and wear resistance.

Figure 6:
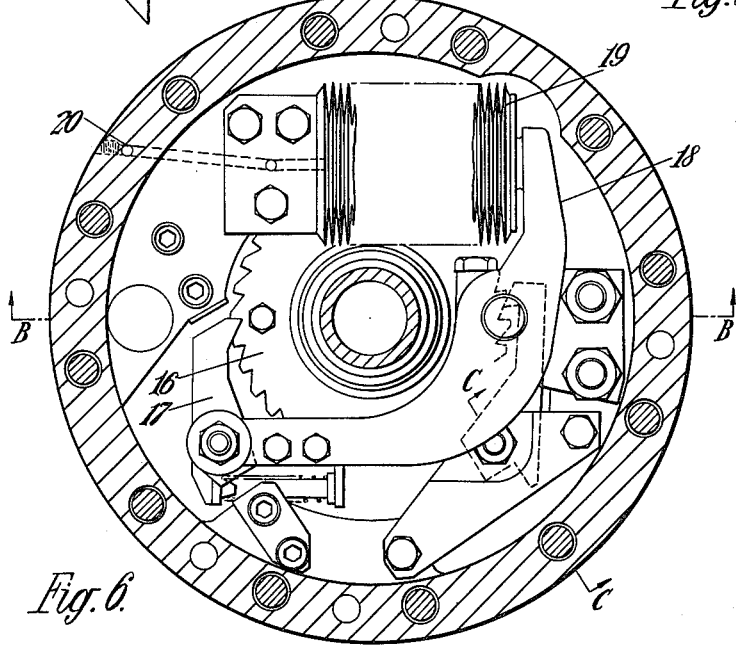
FIGURE 6 is a section view on line AA of FIGURE 5.

The rotatable plate of the selector 10 is mounted in journal bearings 14 on a pillar 15 and is positioned by means of a ratchet wheel 16 indexed by an operating pawl 17 mounted on a bell crank lever 18. The lever 18 is driven by gas operated bellows 19. The bellows and ratchet arrangement can best be seen in FIGURE 6. The action of the bellows is controlled by varying the gas pressure in the operating line by remote control through an inlet duct 20 (see FIGURE 6); alternatively a piston may replace the bellows unit.

The driving means for the selector are given by way of example only and the invention is not restricted to the selector arrangements described the requirement being that the selector can move predetermined distances at intervals to cover the respective ports.

To permit the sampling valve to be remotely controlled, in practice it becomes necessary to have some indication of where the selector is at any given time and this can conveniently be determined by including a blank position for the selector in which it does not connect a port 2 to a port 6. Thus for $n$ rest positions of the selector there are $n-1$ ports 2.

The number of ports 6 must also be not greater than $n-1$ but its preferable to keep the number of these ports below this if possible and in the disposition of the ports 6 and design of bridge member 11 illustrated it is possible to reduce the number of ports 6 to approximately half the number of ports 2.

Figure 2:
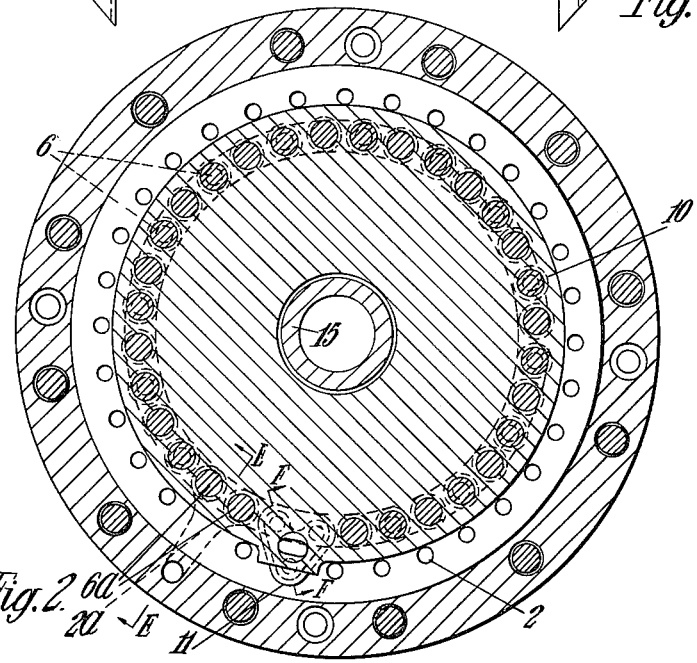
FIGURE 2 is a sectional view on line DD of FIGURE 1 looking in the direction of the arrows.
Figure 5:
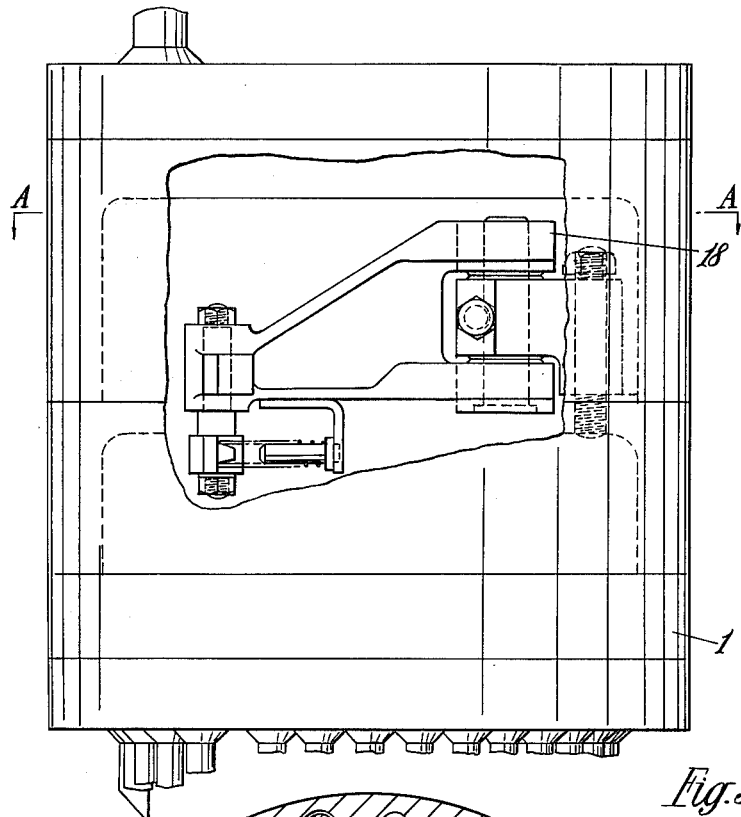
FIGURE 5 is an end view partly in section of FIGURE 1.

The disposition of the ports 6 and shape of the bridge member 11 can best be seen from FIGURE 2.

The ports 2 are shown in the outer ring of ports and the ports 6 in the inner ring but the position can be changed if desired so that ports 6 are on the outer ring and ports 2 on the inner ring.

Assuming for the purpose of explanation that the selector has an even number $n$ of equally spaced rest positions the outer and inner rings both have a corresponding number of positions $n$. In the outer ring $n-1$ positions are constituted by ports 2 and the remaining position by a blank position $2a$.

The inner ring has $n/2$ positions constituted by ports 6 and $n/2$ positions constituted by blank positions $6a$. The positions of the inner ring are displaced circumferentially from those of the outer ring as can be seen in FIGURE 2.

The bridge member 11 has an internal recess 13 shaped as can be seen from the dotted lines in FIGURE 2 and dimensioned so that it spans one position in the outer ring and two adjacent positions in the inner ring.

In the rest position of the bridge shown in FIGURE 2 the internal recess spans one port 2 in the outer ring and two ports 6 in the inner ring. Cooling fluid then flows from port 2 into the two ports 6 in the inner ring and thence into channel 7.

Assuming the selector is moving in a clockwise direction, in the next rest position the recess in the bridge spans the next port 2 in the outer ring, and the left hand side of the part of the recess, positioned over the inner ring spans a blank position $6a$ whilst the right hand side spans a port 6 the latter being the port covered by the left hand side in the position shown in FIGURE 2. A cooling fluid sample is therefore still conected to the channel 7.

The next position of the bridge is the blank position which serves as an indication of the position of the selector. In this position the recess spans a blank position $2a$ in the outer ring and two blank positions $6a$ in the inner ring and during this period on sample is connected to channel 7.

The bridge continues to move clockwise and in all other positions it covers one port in the outer ring and one port on the inner ring until it arrives back at the position shown.

For each position of the selector, apart from the blank position, only one of the ports 2 of the outer ring is connected through a port 6 in the inner ring to channel 7 and samples entering the space 4 mix, the mixed sample leaving through outlet 5 as mentioned previously.

Whilst in the form shown in FIGURE 2 the position where the bridge recess spans two ports in the inner ring is adjacent the blank position this is not essential and the position of the two adjacent ports in the inner ring can be elsewhere in the ring.

If the number of rest positions of the selector is an odd number $n-1$ the number of ports in the outer ring is $n-2$ as before, but the number of ports in the inner ring is $$\frac{2}{n-2}$$

and the remainder of the positions $n/2$ in the inner ring are blank positions. In this case there is no position of the bridge where its recess spans two ports in the inner ring and in all its positions other than the blank position it spans one port and one blank position in the inner ring.

In the application of the valve to a particular reactor by way of example, the number of fuel channels to be monitored is 3720 and 120 valves are used of the form illustrated that is to say each valve having 32 rest positions of the selector and receiving gas samples from 31 fuel channels. The selector is left in the rest position for 30 seconds each time which means that the time taken to monitor 31 channels plus one blank is sixteen minutes.

The valves are arranged in groups of 12, each group having a fission product detector of high sensitivity and one of low sensitivity.

A diagrammatic arrangement of two such groups is shown in FIGURE 8. The groups have the reference letters A and B and each consists of 12 primary valves $A_1$ to $A_{12}$ and $B_1$ to $B_{12}$ respectively. The outlets 9 for the individual samples are each connected to a high sensitivity fission product detector, $SS_A$ for Group A and $SS_B$ for Group B, for a period of 16 minutes under the control of solenoid operated valves $AC_1$ to $AC_{12}$, $BC_1$ to $BC_{12}$ respectively. At the same time the mixed sample outlets 5 of each valve of a group are connected in turn to a low sensitivity fission product detector each for a period of 30 seconds under the control of solenoid operated valves $D_1$ to $D_{12}$. The low sensitivity detector for Group A is represented by $FS_A$ and that for Group B by $FS_B$. Similarly solenoid operated valves D for Group A are represented by $AD_1$ to $AD_{12}$ and those for Group B by $BD_1$ to $BD_{12}$.

To provide for the possibility that one of the low sensitivity detectors might cease to function it is necessary to arrange for the group of valves which the defective detector is serving to be switched to another detector until such time as the fault is repaired.

A convenient arrangement for this is shown in FIGURE 8 in which there is a cross-over connection between Groups A and B and their respective detectors $FS_A$ and $FS_B$. According to this arrangement mixed samples fom Group A are connected for one cycle (6 minutes in the above quoted example) to detector $FS_A$ and then for the next cycle they are connected to detector $FS_B$. Samples from Group B are connected to detector $FS_B$ for one cycle and are then connected for the next cycle to detector $FS_A$. This means that at any given instant a detector is connected either to Group A or to Group B. In the event of failure of one detector all that happens is that the scan time of samples from each of the two groups A and B is doubled. In the above quoted example where the scan time under normal conditions is 6 minutes, with only one detector working the scan time would become 12 minutes but this is still within acceptable limits.

Whilst the mixed samples from a group of 12 valves are scanned in 6 minutes the individual channels feeding the 12 valves are scanned in 3 hours, 12 minutes. These values of scan time are given by way of example only, and they show that by the means described it is possible to detect a fault rapidly through the mixed samples whilst monitoring of the individual channels is taking place concurrently.

If a reading of a low sensitivity detector indicates a fault the valve concerned can be controlled to hunt through its positions passing the single samples to either of two separate high sensitivity detectors $HC_1$ or $HC_2$ until the channel containing the fault is located. When such hunting is taking place the rest time for the selector can be reduced.

When a fault is discovered during the slow scan of individual channels the channel is immediately known and the selector valve concerned can be kept in a position so that it continuously passes a sample from the faulty channel to the high sesitivity detectors $HC_1$, $HC_2$ allowing the sample to be monitored continuously.

The individual samples from a sampling valve are diverted to a high sensitivity detector $HC_1$ or $HC_2$ by way of valves E or G which are also solenoid operated, valves $AE_1$ to $AE_{12}$ and $AG_1$ to $AG_{12}$ being for Group A and $BE_1$ to $BE_{12}$, $BG_1$ to $BG_{12}$ for Group B.

To provide for the possibility that one of the high sensitivity detectors might cease to function it is necessary to arrange for the group of valves which the defective detector is serving to be switched to another detector until such time as the fault is repaired.

A convenient arrangement for this purpose, where immediate replacement is unnecessary, is to use one of the detector units $HC_1$ or $HC_2$. For this purpose spare lines 21A and 21B are provided for groups A and B respectively with connecting valves 22A and 22B for SSA and valves 23A and 23B for SSB. These are used in conjunction with valves 24A, 24B and 25A, 25B to select the most convenient arrangement. Corresponding arrangements are made for transfer of electrical control and presentation of information. Fluid leaving the detectors is returned to the main vessel for recirculation through the reactor via return pipe P.

The recording system for the fast scan, that is to say the scan of the mixed samples from the 12 valves may comprise a recorder for each group of valves, which recorder always records the same group by means of cross switching the signals from FSA and FSB, and chart paper marked in divisions with one division pervalve and a pen trace for each division so that the signal from each mixed sample is recorded in the appropriate division. Separate alarm levels can be set for each mixed sample.

A preferred form of recording system for the scan of individual channels is shown in diagrammatic form in FIGURE 9.

Pulsed signals from the detectors SSA or SSB are passed to a scaler counter 26 which counts the number of pulses and feeds a patchboard 27. The patchboard has a series of parallel conductor strips (not shown) arranged in two separate groups one group in which there are nine strips representing units and the other group, which are numbered consecutively up to any desired number, representing tens of units.

The scaler counter feeds two strips one from each group according to the number of pulses in the signal it receives. For example, if the number of pulses received was 1200 the counter could be arranged to divide the number by 100 so that the signal transferred to the patchboard would consist of two digits namely 12. In such a case the counter would energise the strip 2 on the group of conductors representing the units and the strip 1 in the group representing the tens of units.

Alarm levels are set for each channel of a group by plugs, not shown, which are inserted in the patchboard 27 and make connection with the conductor strips. There are two plugs for each alarm one for a conductor strip in the units groups and the other for a strip in the tens of units group. The plugs are energised separately and connected to a selector switch 28 which works in synchronism with selector valves in any one group. Thus when the signal from a given channel is being fed to the patchboard the plugs setting the alarm level for that channel are connected through the selector switch to an alarm 29 via a comparator circuit 30. Should the signal fed to the patchboard equal or exceed the alarm level the comparator sets off the alarm. The electrical currents flowing through the conductor strips energise solenoids under the keys of an electrical typewriter 31 which prints the value of the signal on a space on a record sheet marked out for the channel being monitored, each channel being alloted a space bearing a reference mark by which the channel is identified. Discrimination between conductor strips energised by the alarm reference and those energised by the signal is achieved by using different supply frequencies. The carriage of the typewriter is synchronised with the selector valves so that the reading for each channel may be recorded. On the record sheet the alarm level and the actual level are printed in the space allowed for each channel and should the alarm be set off for any one channel some indication is also printed in the appropriate space on the record sheet.

In this way when the alarm has been set off the channel identity where the fault is occurring is readily obtainable from the record sheet. Further as the readings for each channel are presented in the form of numerals the space required on a given record sheet for recording the reading for a given channel is much less than in systems where the readings are recorded in the form of graphs.

Whilst an electrical typewriter has been described other forms of printing devices can be used and in some instances it may not be necessary to print each individual reading but only those from a faulty channel. Likewise other methods of comparing signals with alarm levels may be adopted within the scope of the invention.

The sequence of operations carried out by one or more groups of valves and associated detectors and recorders are controlled by a master controller which controls the selection, duration and frequency of operation of the various items.

We claim:

1. A burst slug detection system for a nuclear reactor which system comprises means for continuously passing to fission product detection means in cyclic manner mixed samples of cooling fluid from each of a series of groups of fuel element containing channels in the reactor and samples of cooling fluid from each fuel channel of a group in turn, the cyclic sampling of individual channels and groups of channels taking place simultaneously, which means comprise a sampling valve which at any instant passes a sample from an individual channel of a group and simultaneously passes samples from the remaining channels in the group, said valve comprising a flat ported member having two sets of ports, a first set in which each port is connected to a channel in a group of fuel channels in the reactor there being a port for every channel in the group, outlet ends of said ports communicating with a common space in the valve to which is connected a mixed sample outlet from which a mixed sample of cooling fluid from the group of channels can pass to fission product detection means and a second set of ports having their outlet ends in communication with a channel common to all the ports in said second set, said channel communicating with an individual sample outlet connected to fission product detection means, the inlet ends of said ports opening into the said space common to the outlet ends of the ports in the first set; and selector means sliding over the surface of said ported member and coming to rest at intervals for a given time to connect one of the ports of said first set to one port in said second set whilst sealing the ends of the remaining ports in the second set, each port of said first set being connected in turn to a port in the second set whereby cooling fluid flowing through the port in the first set connected to a port in the second set can enter the aforesaid channel and pass to fission product detection means connected to the individual sample outlet from said channel and cooling fluid passing through the remaining ports in the first set flows through said common space to fission product detection means via the mixed sample outlet.

2. A burst slug detection system comprising a sampling valve in accordance with claim 1 in which the two sets of ports are arranged in concentric rings and the selector means rotates about their common centre.

3. A burst slug detection system for a nuclear reactor which system comprises a sampling valve for continuously passing to fission product detection means in cyclic manner mixed samples of cooling fluid from a group of fuel element containing channels in the reactor and samples of cooling fluid from each fuel channel of a group in turn, the cyclic sampling of the individual channels and group of channels taking place simultaneously, the valve being adapted to pass simultaneously a sample from one channel of a group and a mixed sample from the remaining channels of the group, the valve comprising a flat ported member having two sets of ports arranged in concentric rings, a first set in which each port is connected to a channel in a group of fuel channels in the reactor there being a port for every channel in the group, outlet ends of said ports communicating with a common space in the valve to which is connected a mixed sample outlet from which a mixed sample of cooling fluid from the group of channels can pass to fission product detection means and a second set of ports having their outlet ends in communication with a channel common to all the ports in said second set, said channel communicating with an individual sample outlet connected to fission product detection means, the inlet ends of said ports opening into the said space common to the outlet ends of the ports in the first set; and selector means sliding over the surface of said ported member and coming to rest at intervals for a given time to connect one of the ports of said first set to one port in said second set whilst sealing the ends of the remaining ports in the second set, each port of said first set being connected in turn to a port in the second set whereby cooling fluid flowing through the port in the first set connected to a port in the second set can enter the aforesaid channel and pass to fission product detection means connected to the individual sample outlet from said channel and cooling fluid passing through the remaining ports in the first set flows through said common space to fission product detection means via the mixed sample outlet, one position of the selector means lying intermediate two ports in the first set.

4. A burst slug detection system for a nuclear reactor comprising a sampling valve in accordance with claim 3 in which there are an even number, $n$, of equally spaced rest positions of the selector means and the ports of the first and second sets are disposed in separate concentric rings each ring having $n$ positions corresponding to the rest positions of the selector means, $n-1$ positions of the ring of the first set being ports and the other position being a blank position, whilst $n/2$ positions of the ring of the second set are ports and the remainder blank positions, the positions of the second set being displaced circumferentially from the positions of the first set, and the selector means comprises a bridge member having an internal recess which connects the ports of the first set with ports of the second set said recess being dimensioned so that it spans two positions in the ring of the second set and one position of the ring of the first set, the disposition of the ports in the ring of the second set being such that in the blank position of the selector means the recess in the bridge member spans a blank position in the ring of the first set and two adjacent blank positions in the ring of the second set, in one other rest position of the selector means the said recess spans one port in the first set and two adjacent ports in the second set, and in the remaining rest positions of the selector means the recess spans one port of the first set and one port and an adjacent blank position in the second set.

5. A burst slug detection system for a nuclear reactor comprising a sampling valve in accordance with claim 3 in which there are an odd number, $n-1$, of equally spaced rest postions of the selector means and the ports of the first and second sets are arranged in separate concentric rings each ring having $n-1$ positions corresponding to the rest positions of the selector means, $n-2$ positions of the ring of the first set being ports and one a blank position, $$\frac{n-2}{2}$$

positions of the ring of the second set being ports and the remainder blank positions, the positions of the ring of the second set being displaced circumferentially from the positions of the ring of the first set and the selector means comprising a bridge member which has an internal recess for connecting ports of the first set with ports of the second set said recess being dimensioned so that it spans one position of the ring of the first set and two positions of the ring of the second set the disposition of ports in the ring of the second set being such that in the blank position of the selector means the recess spans the blank position in the first set and two adjacent blank positions in the second set and in the remaining rest positions of the selector means the recess spans one port in the first set and a port and a blank position in the second set.

6. A burst slug detection system for a nuclear reactor of the type having groups of fuel element containing channels, said system comprising fission product detection means, pipes connected to the fuel element containing channels of the reactor for conveying samples of cooling fluid from said channels to said fission product detection means and sampling valve devices interposed in said pipes to control the passing of fluid samples to said fission product detection means, each sampling valve device being connected to said pipes to receive fluid samples from each channel of a group of fuel element containing channels and to pass in cyclic manner a fluid sample from each channel in turn to said fission product detection means and to simultaneously pass in cyclic manner a mixed sample from the other channels of said group to said fission product detection means.

7. A burst slug detection system for a nuclear reactor of the type having groups of fuel element containing channels, said system comprising fission product detection means, pipes connected to the fuel element containing channels of the reactor for conveying samples of cooling fluid from said channels to said fission product detection means and sampling valve devices interposed in said pipes to control the passing of fluid samples to said fission product detection means, each sampling valve device being connected to said pipes to receive fluid samples from each channel of a group of fuel element containing channels and to pass in cyclic manner a fluid sample from each channel in turn to said fission product detection means and to simultaneously pass in cyclic manner a mixed sample from the other channels of said group to said fission product detection means, a plurality of recording charts, means for recording signals from the fission product detection means representing the mixed samples on a said chart and means for recording on a separate recording chart signals representing samples from individual fuel channels, each recording chart for samples from individual fuel channels displaying a number representing a number of pulses in a signal received from the fission product detection means for a given channel and a number representing a preset alarm level for that channel and electrical means for comparing the signal from the fission product detection means and a signal representing the alarm level to energize an alarm when the first-mentioned signal equals or exceeds the alarm level and said electrical means acting on the recording charts to indicate a channel producing a signal in excess of the alarm level.

References Cited by the Examiner

UNITED STATES PATENTS

| 2,777,812 | 1/1957 | Powell et al. | 176—19 |
| 2,979,451 | 4/1961 | Pettinger | 137—625.11 |
| 3,005,467 | 10/1961 | Suchoza et al. | 127—625.11 |

FOREIGN PATENTS

| 814,416 | 6/1959 | Great Britain. |

OTHER REFERENCES

Proceedings of the Second United Nations International Conference on the Peaceful Uses of Atomic Energy, Sept. 1–13, 1958, vol. 7, pp. 478–481.

REUBEN EPSTEIN, *Primary Examiner.*

CARL D. QUARFORTH, *Examiner.*